United States Patent
Yap et al.

(10) Patent No.: US 8,271,715 B2
(45) Date of Patent: Sep. 18, 2012

(54) MODULAR SCALABLE PCI-EXPRESS IMPLEMENTATION

(75) Inventors: Keng Teck Yap, Selangor (MY); Azydee Hamid, Penang (MY)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 12/058,830

(22) Filed: Mar. 31, 2008

(65) Prior Publication Data

US 2009/0248944 A1 Oct. 1, 2009

(51) Int. Cl.
*G06F 13/36* (2006.01)
(52) U.S. Cl. .................................................. 710/310
(58) Field of Classification Search .................... 710/310
See application file for complete search history.

(56) References Cited

U.S. PATENT DOCUMENTS

| | | | | |
|---|---|---|---|---|
| 6,822,966 | B2 * | 11/2004 | Putcha et al. | 370/411 |
| 7,293,127 | B2 * | 11/2007 | Caruk | 710/305 |
| 7,587,575 | B2 * | 9/2009 | Moertl et al. | 711/206 |
| 7,630,389 | B1 * | 12/2009 | Alfieri et al. | 370/412 |
| 2006/0227143 | A1 * | 10/2006 | Maita et al. | 345/501 |
| 2008/0288798 | A1 * | 11/2008 | Cooper et al. | 713/322 |
| 2009/0154456 | A1 * | 6/2009 | Dodson et al. | 370/389 |

* cited by examiner

*Primary Examiner* — Paul R Myers
*Assistant Examiner* — Jeremy S Cerullo
(74) *Attorney, Agent, or Firm* — International IP Law Group, P.L.L.C.

(57) ABSTRACT

In some embodiments a functional PCI Express port includes first buffers and an idle PCI Express port includes second buffers. One or more of the second buffers are accessed by the functional PCI Express port. Other embodiments are described and claimed.

32 Claims, 4 Drawing Sheets

MODULAR SCALABLE PCI-EXPRESS IMPLEMENTATION

TECHNICAL FIELD

The inventions generally relate to a modular and scalable PCI-Express implementation.

BACKGROUND

Chipset designs such as some Intel Input/Output Controller Hub (ICH) designs include an implementation of PCI-Express (PCIe) ports that is not modular, and thus not scalable. As an example, the shared buffer in some Intel ICH designs is only shared with four PCIe ports, and there is not any flexibility to expand the number of PCIe ports beyond four. This makes it extremely difficult to design, for example, a new System On Chip (SOC) with a different number of PCIe ports. For example, if a new SOC design requires five PCIe ports, a major effort is necessary in order to convert the four ICH PCIe ports to five ICH PCIe ports for the new SOC design. Additionally, it is not convenient to reduce the number of PCIe ports to less than four. If a new SOC requires only three PCIe ports and it has to adopt an ICH design that includes four PCIe ports, an additional cost of integrating the fourth port is necessary.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to a modular and scalable PCI-Express implementation.

In some embodiments a functional PCI Express port includes first buffers and an idle PCI Express port includes second buffers. One or more of the second buffers are accessed by the functional PCI Express port.

In some embodiments, access is provided to one or more buffers of a functional PCI Express port. The functional PCI Express port is provided access to one or more buffers included in an idle PCI Express port.

Figure 1:
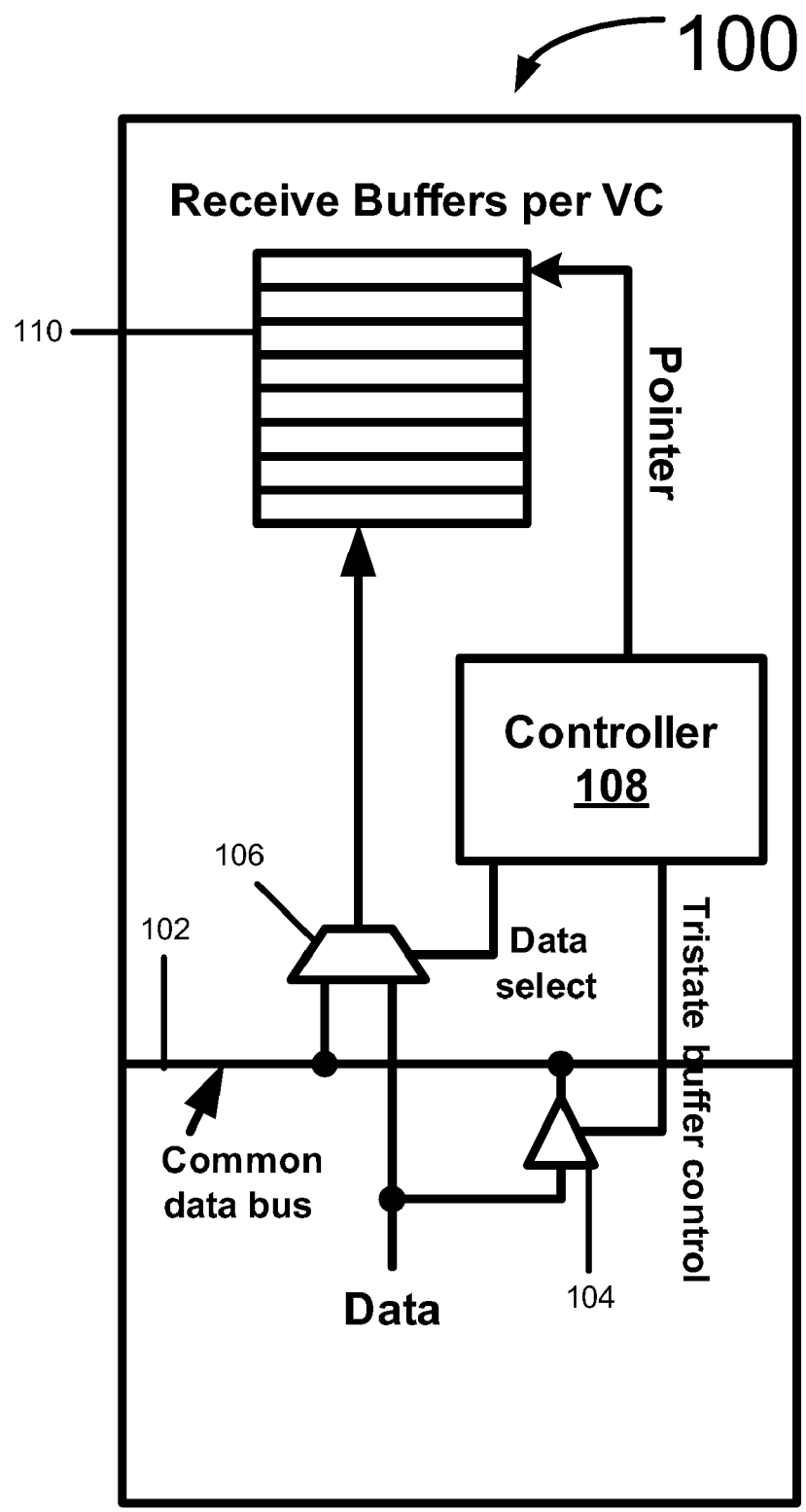
FIG. 1 illustrates a system according to some embodiments of the inventions.

FIG. 1 illustrates a system 100 according to some embodiments. In some embodiments system 100 is an implementation using one PCI-Express (PCIe) port. In some embodiments, system 100 includes one PCIe port. System 100 includes a common data bus 102, a tristate buffer 104, a multiplexer (MUX) 106, a controller 108, and buffers 110 (for example, Virtual Channel (VC) receive buffers and/or transmit buffers).

In some embodiments, system 100 is a scalable implementation that significantly increases the performance of a PCI-Express port with addition of minimal logic and/or power. In some embodiments, system 100 is a scalable implementation that significantly increases the performance of a PCI-Express port in a System On Chip (SOC) design with addition of minimal logic and/or power.

In typical SOC designs, and depending on system application, not all PCIe ports are utilized. Conventionally, these unused ports are powered down to save power. However, in some embodiments, logic in the unused PCIe ports is used to boost the performance of the running PCIe ports. In some embodiments, this is performed in a modular and/or scalable manner.

In some embodiments, Virtual Channel (VC) receive/transmit buffers 110 are used at the transceiver layer of unused PCIe ports. In some embodiments, controller 108 is a data write enable, data read enable, pointer counter, data selector and/or state machine. Controller 108 may be used as a controller for a buffer pointer, a data write enable, a data read enable, and/or data select, etc.

In some embodiments, system 100 operates in two modes of operation, including a normal mode and a shared mode. In the normal mode, all ports are independent and function as a separate entity (that is, the one PCIe port of system 100 is independent and functions as a separate entity from any other PCIe ports). In the shared mode, the virtual buffers 110 in a non-functional PCIe port are used to boost performance of functional PCIe ports.

The common data bus 102 is connected to common data buses on all ports (other ports connected to the common data bus 102 are not illustrated in FIG. 1). During the normal mode of operation, common data bus 102 is left idle by tristating all tristate buffers in all PCIe ports (for example, in some embodiments, tristate buffer 104). During the shared buffer mode, the common data bus 102 is driven by data from a functional PCIe port. This is accomplished, for example, by activating the tristate buffer for the functional PCIe port (for example, in some embodiments, tristate buffer 104) while maintaining tristate buffers in other (for example, all other) PCIe ports in the tristate mode.

Controller 108 includes in some embodiments a counter and a state machine, for example. The state machine controls, for example, data write enable (and/or data read enable) signals and/or pointer signals. Controller 108 serves as an arbiter to activate buffers 110 from other PCIe ports. Controller 108 also selects using MUX 106 either data from the common data bus 102 or from the regular data bus (input Data signal) depending on the mode of operation. In some embodiments, when operating in the normal mode, the common data bus 102 is left idle by tristating the tristate buffers in all PCIe ports (for example, including tristate buffer 104) and the input Data is provided to (and/or from) the buffers 110 via the MUX 106. In some embodiments, when operating in the shared mode, the common data bus 102 is driven by data from a functional PCIe port, and data from common bus 102 may be provided via MUX 106 to buffers 110.

Figure 2:
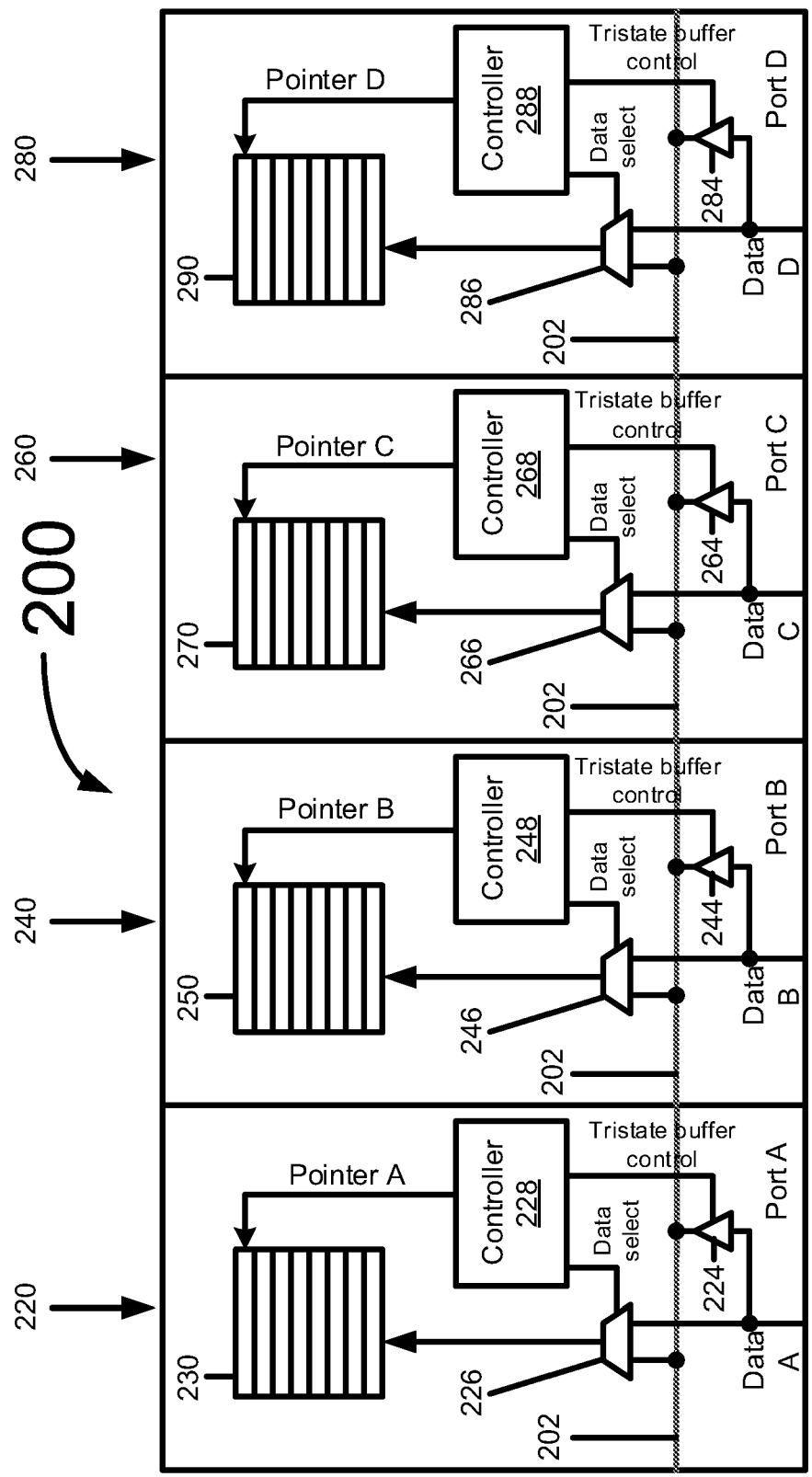
FIG. 2 illustrates a system according to some embodiments of the inventions.

FIG. 2 illustrates a system 200 according to some embodiments. In some embodiments system 200 is an implementation using four PCI-Express (PCIe) ports, including PCIe port A 220, PCIe port B 240, PCIe port C 260, and PCIe port D 280. In some embodiments, some or all of the PCIe ports are similar to or identical to the PCIe port illustrated in FIG. 1. In some embodiments, system 200 includes four PCIe ports as illustrated in FIG. 2, but in other embodiments, any number of PCIe ports may be included in system 200. System 200 further includes a common data bus 202 on all four PCIe ports A 220, B 240, C 260, and D 280.

PCIe port A 220 includes a tristate buffer 224, a multiplexer (MUX) 226, a controller 228, and buffers 230 (for example, Virtual Channel (VC) receive buffers and/or transmit buffers). PCIe port B 240 includes a tristate buffer 244, a multiplexer (MUX) 246, a controller 248, and buffers 250 (for example, Virtual Channel (VC) receive buffers and/or transmit buffers). PCIe port C 260 includes a tristate buffer 264, a multiplexer (MUX) 266, a controller 268, and buffers 270 (for example, Virtual Channel (VC) receive buffers and/or transmit buffers). PCIe port D 280 includes a tristate buffer 284, a multiplexer (MUX) 286, a controller 288, and buffers 290 (for example, Virtual Channel (VC) receive buffers and/or transmit buffers).

In some embodiments, system 200 is a scalable implementation that significantly increases the performance of a PCI-Express port with addition of minimal logic and/or power. In some embodiments, system 200 is a scalable implementation that significantly increases the performance of a PCI-Express port in a System On Chip (SOC) design with addition of minimal logic and/or power.

In typical SOC designs, and depending on system application, not all PCIe ports are utilized. Conventionally, these unused ports are powered down to save power. However, in some embodiments, logic in the unused PCIe ports is used to boost the performance of the running PCIe ports. In some embodiments, this is performed in a modular and/or scalable manner.

In some embodiments, Virtual Channel (VC) receive/transmit buffers 230, 250, 270, and/or 290 are used at the transceiver layer of unused PCIe ports. In some embodiments, controllers 228, 248, 268, and/or 288 control a data write enable, data read enable, pointer counter, data selector and/or state machine. Controllers 228, 248, 268, and/or 288 may be used as a controller for a buffer pointer, a data write enable, a data read enable, and/or data select, etc.

In some embodiments, system 200 operates in two modes of operation, including a normal mode and a shared mode. In the normal mode, all ports 220, 240, 260, and 280 are independent and function as a separate entity (that is, each PCIe port of system 200 is independent and functions as a separate entity from all other PCIe ports). In the shared mode, the virtual buffers 230, 250, 270, and/or 290 in a non-functional PCIe port are used to boost performance of functional PCIe ports.

In some embodiments, and as illustrated in FIG. 2, the common data bus 202 is connected through all ports of system 200. During the normal mode of operation, common data bus 202 is left idle by tristating all tristate buffers 224, 244, 264, and/or 284 in all PCIe ports. During the shared buffer mode, the common data bus 202 is driven by data from a functional one or more of the PCIe ports 220, 240, 260, and/or 280. This is accomplished, for example, by activating the tristate buffer for the functional PCIe port while maintaining tristate buffers in other (for example, all other) PCIe ports in the tristate mode.

Controllers 228, 248, 268, and/or 288 each include in some embodiments a counter and a state machine, for example. The state machine controls, for example, data write enable (and/or data read enable) signals and/or pointer signals. Controllers 228, 248, 268, and/or 288 together and/or separately serve as an arbiter to activate buffers 230, 250, 270 and/or 290, respectively, from other PCIe ports. Controllers 228, 248, 268, and 288 also each select using MUX 226, 246, 266, and 288, respectively, either data from the common data bus 202 or from the regular data bus (input signal Data A, Data B, Data C, and Data D, respectively) depending on the mode of operation. In some embodiments, when operating in the normal mode, the common data bus 202 is left idle by tristating the tristate buffers in all PCIe ports and the input Data is provided to (and/or from) the buffers 230, 250, 270, and/or 290 via the MUX 226, 246, 266, and/or 286, respectively. In some embodiments, when operating in the shared mode, the common data bus 202 is driven by data from a functional PCIe port, and data from common bus 202 may be provided via the respective MUX 226, 246, 266, and 286 to buffers 230, 250, 270, and 290, respectively.

In some embodiments, as illustrated in FIG. 2, for example, a four PCIe port implementation is used. It is noted, however, that in some embodiments, scaling to any number of PCIe ports may be implemented.

During regular mode operation of system 200 of FIG. 2, data will come from the regular data bus (that is, from Data A, Data B, Data C, and/or Data D, etc.), and the tristate buffers 224, 244, 264, and 284 will be in a tristate mode. Further, the pointers (for example, Pointer A, Pointer B, Pointer C, and Pointer D) and the Data Write Enables, Data Read Enables, and/or Data Selects will behave as usual.

During a shared buffer mode, operation is different. For example, in some embodiments, only PCIe port A 220 is being utilized in an SOC design as a functional port, and logic from the non-functional ports (that is, PCIe port B 240, PCIe port C 260, and PCIe port D 280) are utilized during a shared buffer mode. In some embodiments, the logic used in the non-functional ports is logic located at the transaction layer of the non-functional ports.

In some embodiments, during a shared buffer mode in which only PCIe port A 220 is a functional port and the other PCIe ports 240, 260, and 280 are non-functional ports, data select signals from the controllers 248, 268, and 288 to the multiplexers 246, 266, and 286, respectively, will choose data from the common data bus 202. The tristate buffer 224 of port A 220 will be configured to select input Data A. All the other tristate buffers 244, 264, and 284 of ports B 240, C 260, and D 280, respectively, will be left in tristate mode. In this manner, input Data A will drive the common data bus 202.

Figure 3:
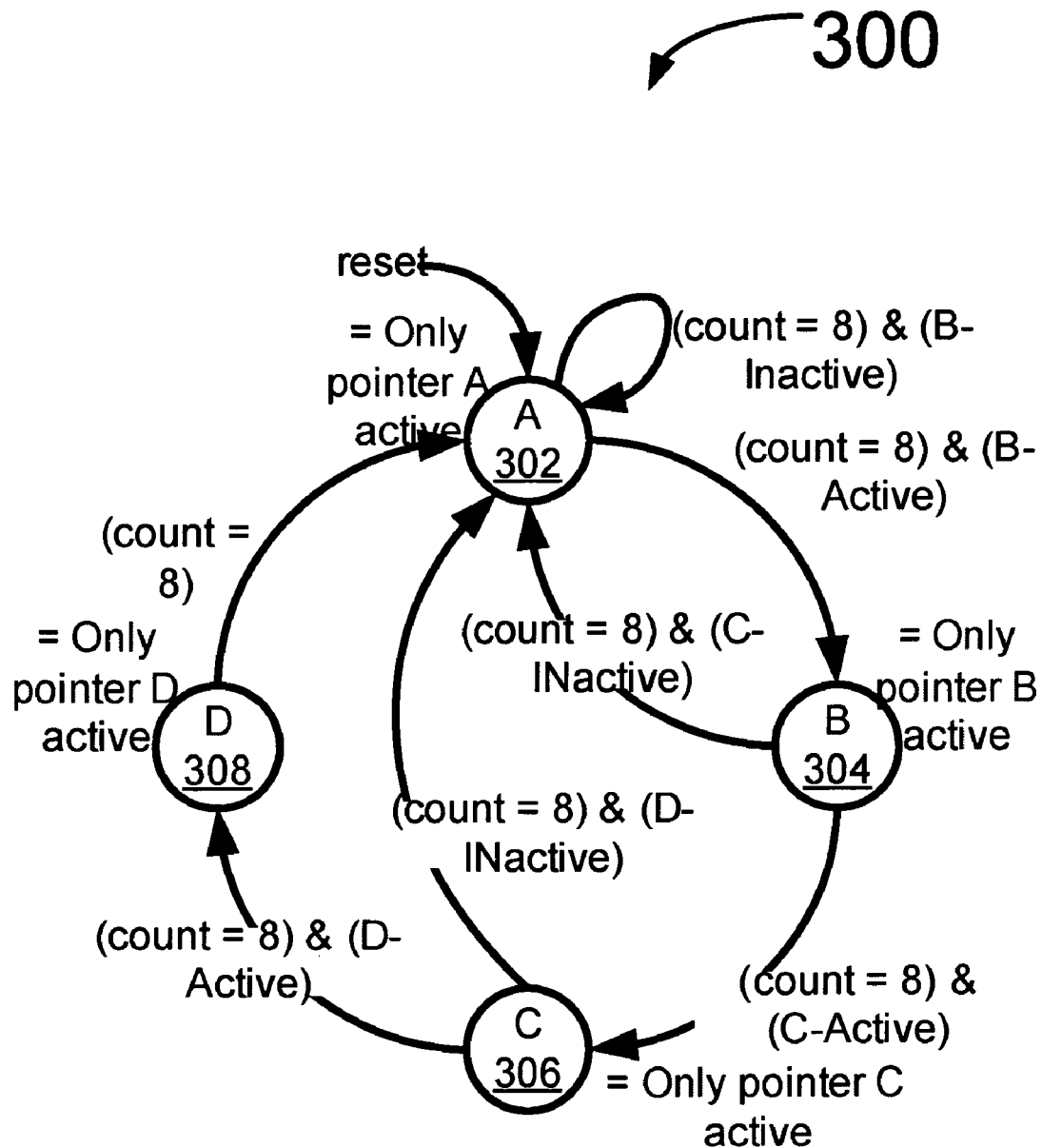
FIG. 3 illustrates a flow according to some embodiments of the inventions.

FIG. 3 illustrates a state machine 300 according to some embodiments. In some embodiments, state machine 300 is a state machine used to choose active logic between PCI Express (PCIe) ports during a shared buffer mode. In some embodiments, the state machine 300 operation may be implemented, for example, in controller 108 illustrated in FIG. 1, and/or in one or more of controllers 228, 248, 268, and/or 288 illustrated in FIG. 2. For example, during a shared buffer mode in which only PCIe port A 220 is a functional port and the other PCIe ports 240, 260, and 280 are non-functional ports. State machine 300 includes a state A 302, a state B 304, a state C 306, and a state D 308. Control signals such as, for example, pointers, data write enables, data read enables, etc. will behave based on state machine 300 according to some embodiments. Data is first filled in receive buffers 230 of port A 220. Once receive buffers 230 are full, receive buffers 250 of port B 240 are filled. Once receive buffers 250 are full, receive buffers 270 of port C 260 are filled. Once receive buffers 270 are full, receive buffers 290 of port D 280 are filled. Once all four buffers 230, 250, 270, and 290 are filled, the pointer is looped back to port A 220.

In some embodiments as illustrated, for example, in FIG. 3, four PCIe ports are used (for example, ports A, B, C, and D of FIG. 2). However, in some embodiments, any number of ports may be implemented. In some embodiments as illustrated in FIG. 2 and FIG. 3, for example, eight buffer entries per port are used (that is count=8, for example). However, in some embodiments, any number of buffer entries per port may be implemented.

As illustrated in FIG. 3, during reset, port A is configured as the only functional port and flow is at state A 302 at which only pointer A (to the buffers in port A) is active. Once the buffers at port A are full, as long as the count remains at 8, and a B-inactive signal is present, flow remains at state A 302. Once a B-active signal is asserted to indicate that the shared buffer logic inside port B will be utilized (and the count is at 8), flow moves to state B 304, at which only pointer B (to the buffers in port B) is active. Once the buffers at port B are full (count=8), if a C-active signal has not been asserted (C-inactive), flow returns to state A 302. However, once the buffers at port B are full (count=8), if the C-active signal is asserted to indicate that the shared buffer logic inside port C will be utilized, flow moves to state C 306, at which only pointer C (to the buffers in port C) is active. Once the buffers at port C are full (count=8), if a D-active signal has not been asserted (D-inactive), flow returns to state A 302. However, once the buffers at port C are full (count=8), if the D-active signal is asserted to indicate that the shared buffer logic inside port D will be utilized, flow moves to state D 308, at which only pointer D (to the buffers in port D) is active. Once the count=8 for the buffers in port D (that is, the buffers at port D are full), then flow returns to state A 302.

According to some embodiments, in an implementation with four PCIe ports and eight buffers per port, the size of the receive buffers for a functional port A (with the three other ports B, C and D being non-functional) can be increased from eight entries to thirty two entries (8 buffers per port×4 ports=32 entries).

Although embodiments in FIGS. 1-3 have been described and illustrated mostly in reference to data write operations, according to some embodiments, the invention is implemented in reference to data read operations, and in some embodiments data read and/or write implementations may be performed.

Figure 4:
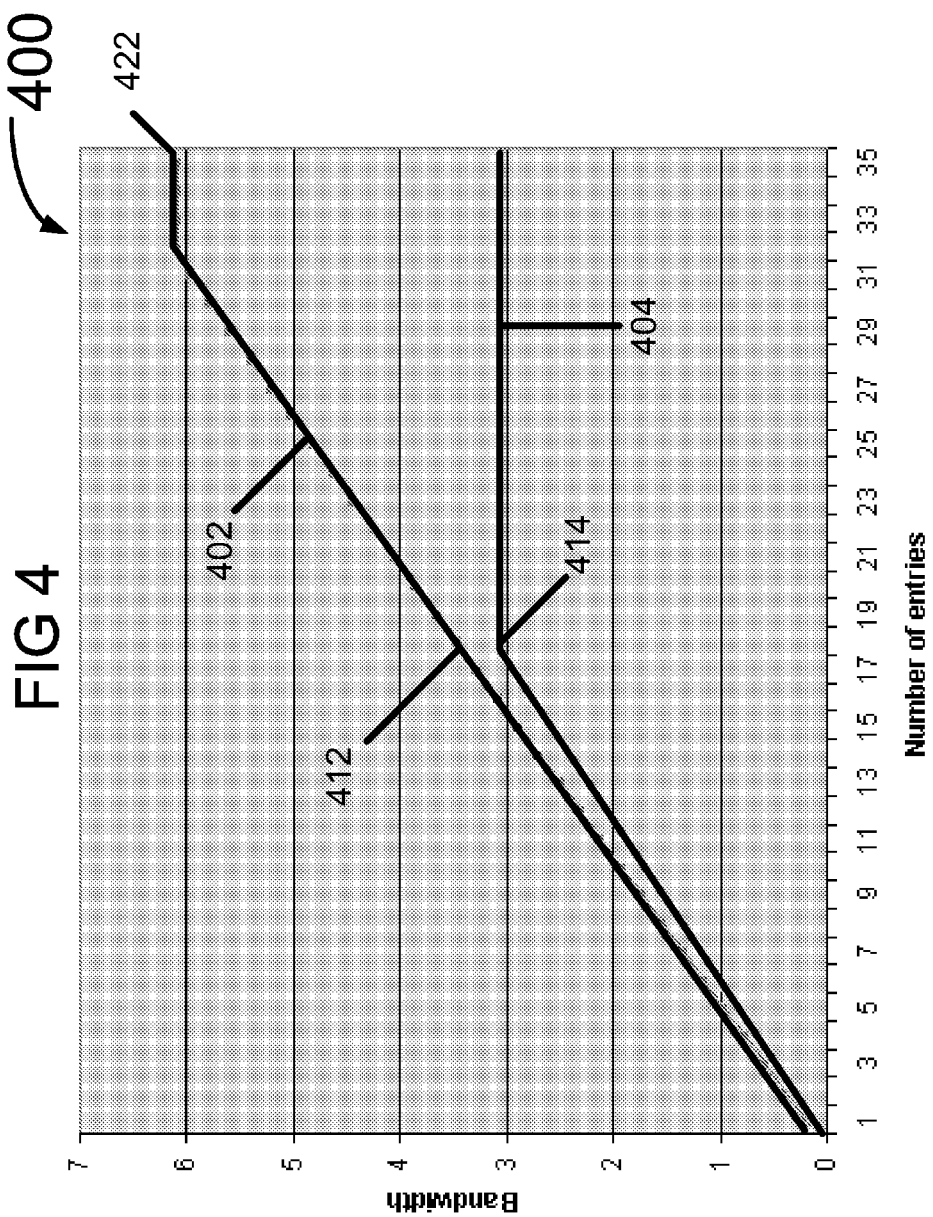
FIG. 4 illustrates a graph according to some embodiments of the inventions.

FIG. 4 illustrates a graph 400 according to some embodiments. Graph 400 compares the number of entries vs. bandwidth in Gb/s of a chipset with a PCIe ×16 configuration 402 and a PCIe ×8 configuration 404, in which the chip has, for example, two ports and supports 1×16 and 2×8 configurations according to some embodiments. Graph 400 illustrates a relationship between the bandwidth in Gb/s and a write request queue size, for example. In the design of each port, the chip uses 18 entries to hit the maximum ×8 bandwidth, which is approximately 3.05 Gb/s, as illustrated by point 414 of graph 404. When both ports are in operation, a total throughput of 2×3.05 Gb/s=6.1 Gb/s is possible. When only one port is in operation in the 1×16 configuration, the bandwidth for 18 queue entries is approximately 3.5 Gb/s, as illustrated by point 412 of graph 402. However, according to some embodiments, the write queue size may be doubled to 36 entries, the bandwidth may be increased to approximately 6.1 Gb/s, as illustrated by point 422 of graph 402. This is a gain of more than 74% compared to the original implementation. The values on the graph have been approximated using an Intel chipset, but it is noted that the values are approximate and may have a margin of error (for example, plus or minus 5%).

In some embodiments, only the logic used in the non-functional ports (for example, ports B, C, and D) needs to be clocked rather than the entire port. This can be accomplished according to some embodiments, by using a clock gating arrangement.

In some embodiments, the PCIe port performance is increased in a manner that is fully modular and scalable. The number of ports may be scaled according to some embodiments depending on the requirements of the chip and/or the SOC. In some embodiments, a significant performance gain is possible by using logic that is already present in the SOC. Thus, very minimal additional logic is necessary, since most of the logic is already present in the original silicon. In some embodiments, little additional power is necessary, since only minimal additional logic need be powered. As discussed above, a simple clock gating scheme may be employed to power up only necessary logic in an unused port (or ports). Therefore, higher performance is provided with very few implications to cost, die size, and/or power.

In some embodiments, PCIe logic which is left idle on a chip may be used. In some embodiments, idle PCIe Virtual Channel (VC) buffers may be used to boost performance of PCIe ports that are running.

Although some embodiments have been described herein as being implemented in a particular manner, according to some embodiments these particular implementations may not be required. For example, although some implementations have been described herein as applying to implemented during data write operations, some embodiments apply to date read operations, and some embodiments apply to data read and/or write operations.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
    a functional PCI Express port including first buffers and a first controller to control buffer pointer, data write enable, and/or data select; and
    an idle PCI Express port including second buffers and a second controller to control buffer pointer, data write enable, and/or data select;
    wherein one or more of the second buffers are accessed by the functional PCI Express port.

2. The apparatus of claim 1, wherein the one or more of the second buffers are used by the functional PCI Express port after all of the first buffers have been filled.

3. The apparatus of claim 1, further comprising a common data bus coupled to the functional PCI Express port and coupled to the idle PCI Express port.

4. The apparatus of claim 3, the functional PCI Express port including the first controller to provide data between the first buffers and the common data bus.

5. The apparatus of claim 3, the idle PCI Express port including the second controller to provide input data between the second buffers and the functional PCI Express port via the common data bus.

6. The apparatus of claim 1, the functional PCI Express port including the first controller to provide data between the functional PCI Express port and the second buffers.

7. The apparatus of claim 1, the idle PCI Express port including the second controller to provide data between the second buffers and the functional PCI Express port.

8. The apparatus of claim 1, further comprising a clock gating device to limit power provided to the idle PCI Express port.

9. The apparatus of claim 8, wherein the clock gating device is to provide power to the second buffers.

10. The apparatus of claim 1, further comprising one or more additional idle PCI Express port each including buffers, wherein one or more of the buffers included in at least one of the one or more additional idle PCI Express ports are accessed by the functional PCI Express port.

11. The apparatus of claim 10, wherein one or more of the buffers of each of the one or more additional idle PCI Express ports are accessed by the functional PCI Express port.

12. The apparatus of claim 1, wherein the apparatus is scalable such that any number of PCI Express ports may be included.

13. The apparatus of claim 1, wherein one or more of the first buffers and/or one or more of the second buffers are virtual channel receive/transmit buffers.

14. The apparatus of claim 1, wherein the second buffers are used to boost performance of the functional PCI Express port.

15. The apparatus of claim 1, further comprising a common data bus coupled to the functional PCI Express port and the idle PCI Express port, wherein during a normal mode the common data bus is left idle, and wherein during a shared buffer mode the common data bus is driven by data from the functional PCI Express port.

16. The apparatus of claim 15, wherein during the normal mode the common data bus is left idle by tristating tristate buffers in all PCI Express polls, and wherein during the shared buffer mode the common data bus is driven by the data from the functional port by activating a tristate buffer of the functional PCI Express port while maintaining buffers in all other PCI Express ports in tristate mode.

17. The apparatus of claim 15, wherein the first controller and/or the second controller includes a counter and a state machine to control data write enable and pointer signals, to serve as an arbiter to activate buffers from different ports, and to select data either from the common data bus or from a regular bus depending on whether a mode of operation is the normal mode or the shared buffer mode.

18. The apparatus of claim 1, wherein the first controller and/or the second controller includes a counter and a state machine to control data write enable and pointer signals, to serve as an arbiter to activate buffers from different ports, and to select data either from a common data bus or from a regular bus depending on a mode of operation.

19. A method comprising:
    providing access to one or more buffers of a functional PCI Express port; and
    providing to the functional PCI Express port access to one or more buffers included in an idle PCI Express port;
    controlling at the functional PCI Express port buffer pointer, data write enable, and/or data select; and
    controlling at the idle PCI Express port buffer pointer, data write enable, and/or data select.

20. The method of claim 19, wherein the one or more of the buffers included in the idle PCI Express port are used by the functional PCI Express port after all of the buffers of the functional PCI Express port have been used.

21. The method of claim 20, further comprising limiting power provided to the idle PCI Express port.

22. The method of claim 21, wherein the limiting includes providing power to the buffers of the idle PCI Express port.

23. The method of claim 19, further comprising providing data between the functional PCI Express port and the buffers of the idle PCI Express port.

24. The method of claim 19, further comprising accessing by the functional PCI Express port one or more buffers included in each of one or more additional idle PCI Express ports.

25. The method of claim 24, further comprising accessing by the functional PCI Express port one or more buffers included in all of a plurality of the one or more additional idle PCI Express ports.

26. The method of claim 19, further comprising accessing by the functional PCI Express port one or more buffers included in all of a scalable number of additional idle PCI Express ports.

27. The method of claim 19, wherein one or more of the one or more buffers of the functional PCI Express port and/or one or more of the one or more buffers included in the idle PCI Express port are virtual channel receive/transmit buffers.

28. The method of claim 19, wherein the one or more buffers included in the idle PCI Express port are used to boost performance of the functional PCI Express port.

29. The method of claim 19, further comprising:
leaving idle a common data bus coupled to the functional PCI Express port and the idle PCI Express port during a normal mode; and
driving the common data bus by data from the functional PCI Express port during a shared buffer mode.

30. The method of claim 19, further comprising:
tristating tristate buffers in all PCI Express ports to leave idle a common data bus coupled to the functional PCI Express port and the idle PCI Express port during a normal mode; and
activating a tristate buffer of the functional PCI Express port while maintaining buffers in all other PCI Express ports in tristate mode to drive the common data bus by data from the functional PCI Express port during a shared buffer mode.

31. The method of claim 19, further comprising at the functional PCI Express port and/or at the idle PCI Express port controlling data write enable and pointer signals, serving as an arbiter to activate buffers from different ports, and/or selecting data either from a common data bus or from a regular bus depending on a mode of operation.

32. The method of claim 19, further comprising at the functional PCI Express port and/or at the idle PCI Express port controlling data write enable and pointer signals, serving as an arbiter to activate buffers from different ports, and/or selecting data either from a common data bus or from a regular bus depending on whether a mode of operation is the normal mode or the shared buffer mode.

* * * * *